May 8, 1962  W. C. LANNING ETAL  3,034,053
ANALOG-TO-DIGITAL CONVERTER
Filed March 6, 1956  5 Sheets-Sheet 1

INVENTORS
WALTER C. LANNING
ROBERT E. SPERO
BY
ATTORNEY

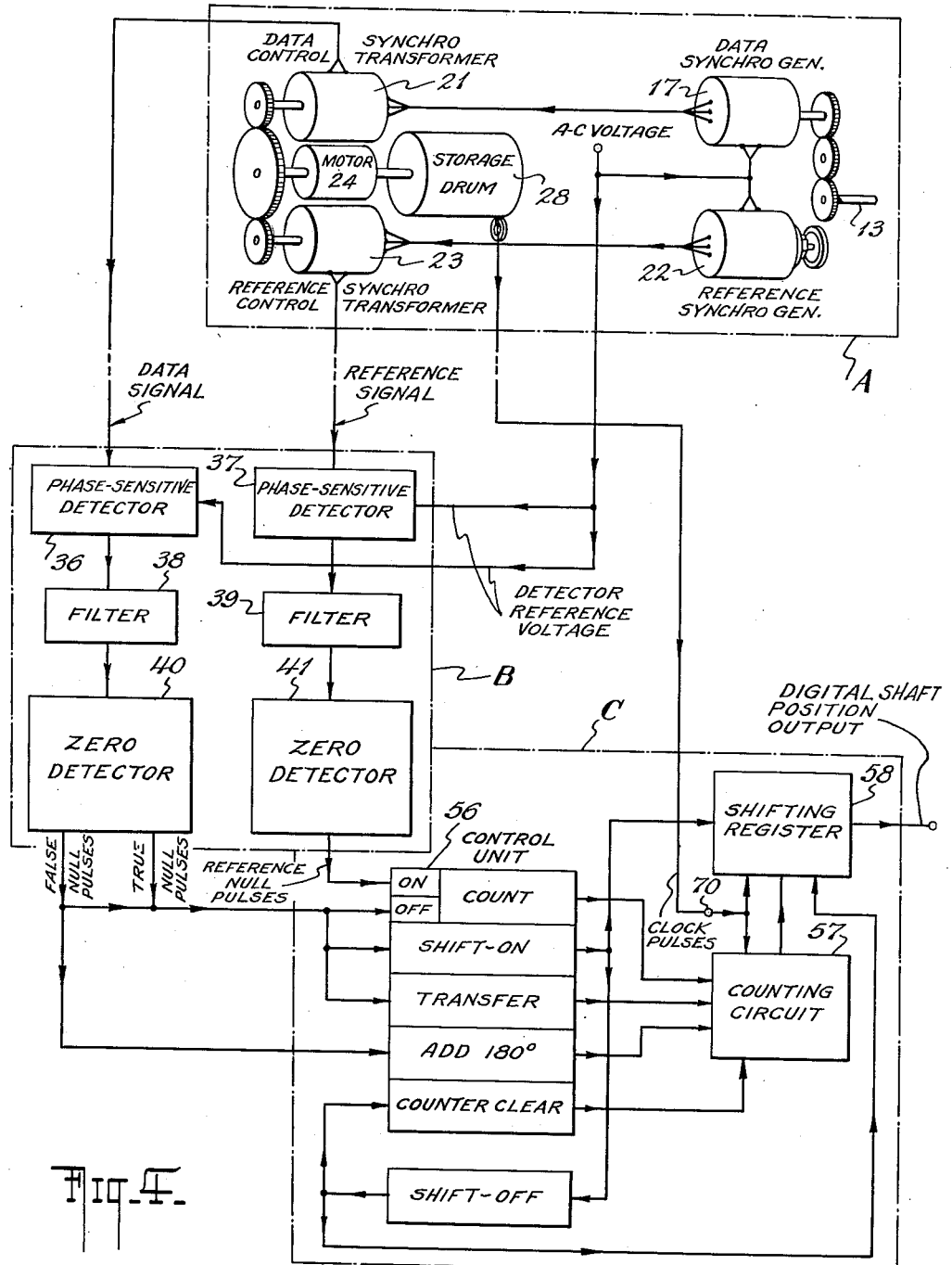

May 8, 1962  W. C. LANNING ETAL  3,034,053
ANALOG-TO-DIGITAL CONVERTER
Filed March 6, 1956  5 Sheets-Sheet 4
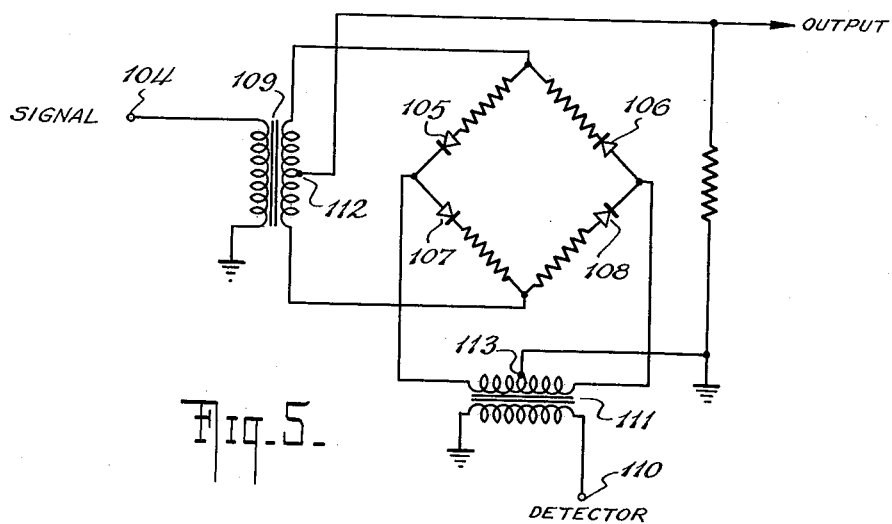
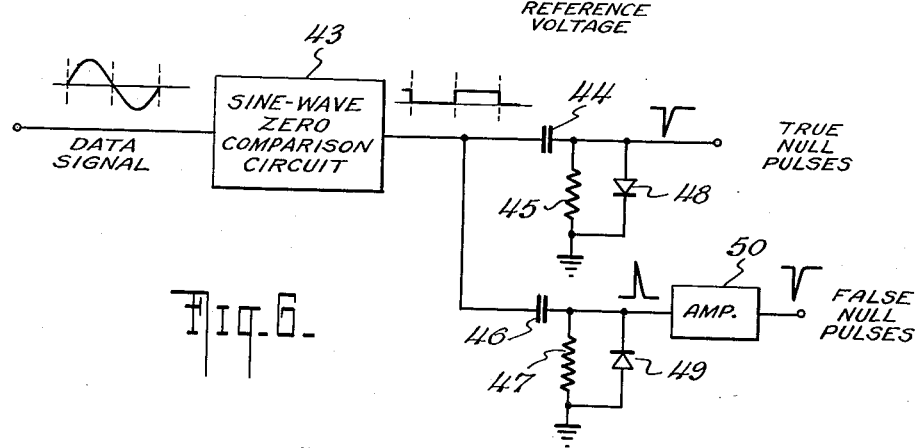
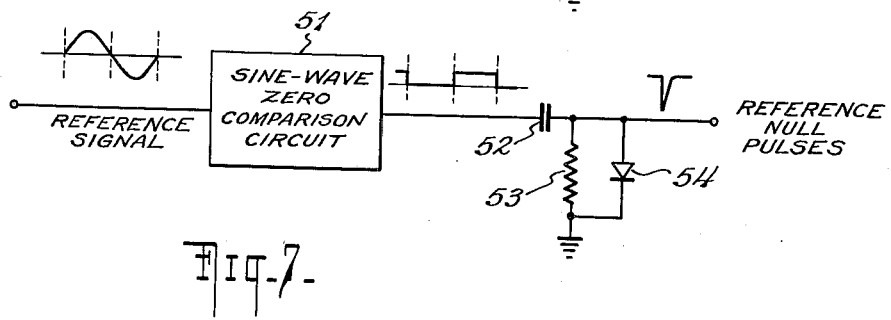
INVENTORS
WALTER C. LANNING
ROBERT E. SPERO
BY
ATTORNEY

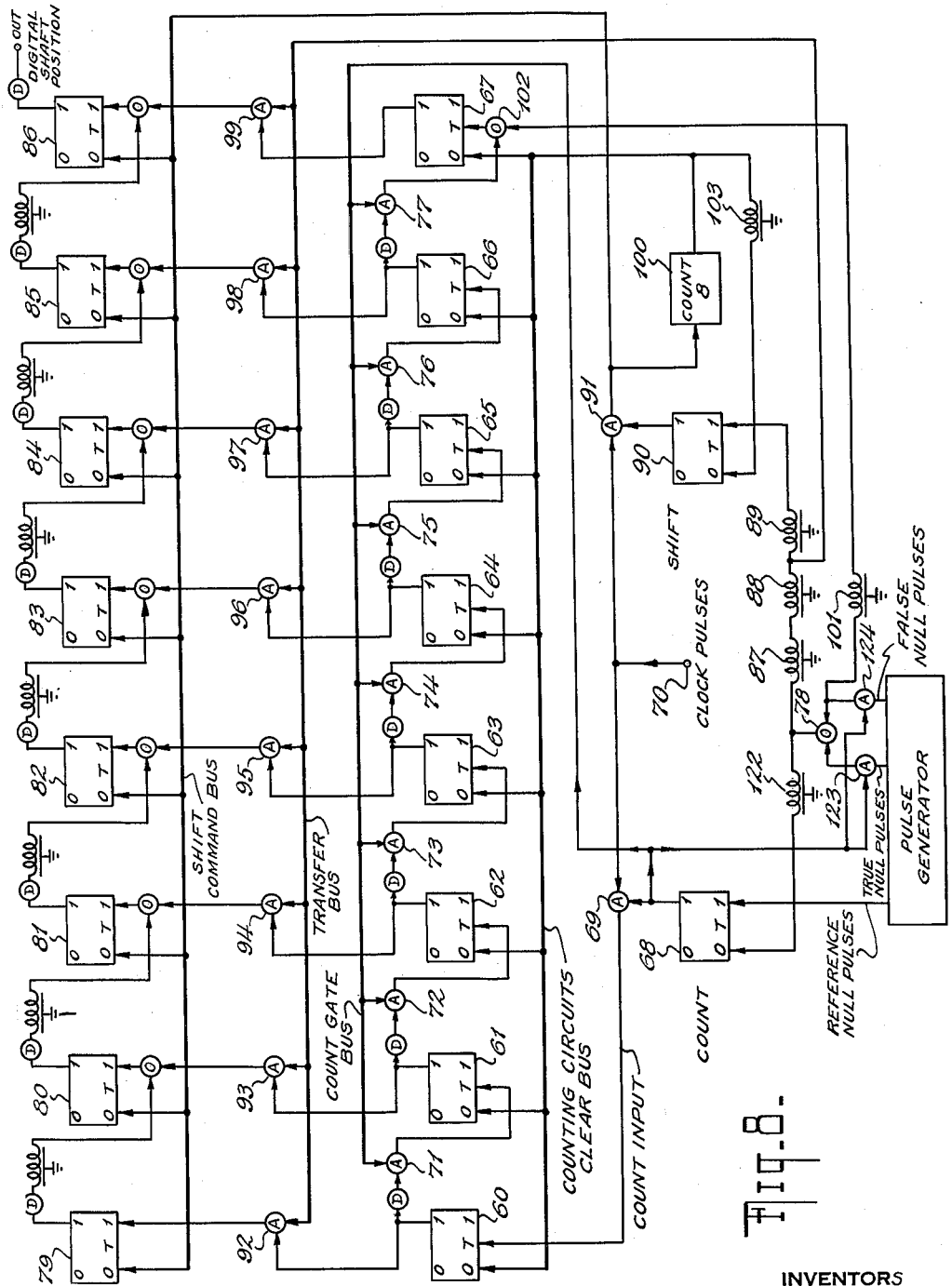

United States Patent Office 3,034,053
Patented May 8, 1962

---

3,034,053
ANALOG-TO-DIGITAL CONVERTER
Walter C. Lanning, Plainview, and Robert E. Spero, New Hyde Park, N.Y., assignors to Sperry Rand Corporation, a corporation of Delaware
Filed Mar. 6, 1956, Ser. No. 569,917
6 Claims. (Cl. 324—83)

This invention relates to analog-to-digital data converters and more particularly to a system for converting angular shaft position data to digital code.

It is often necessary in data transmission systems and in the field of digital computers to convert the angular position of a shaft in analog form to the digital form. For example, it may be desired to transmit to a distant location information as to the azimuthal position of a rotatable antenna. By converting the azimuthal position data to digital code before transmission, economy, rapidity, and accuracy in transmission are achieved. A digital-to-analog data converter at the distant location reproduces the transmitted data in usable form. Prior art converter systems employ special generators coupled to the rotatable shaft for delivering signals which may be encoded for transmission of shaft position data to a distant location. However, at the location of the shaft, the azimuthal position data is often transmitted in analog form to nearby repeating instruments, as communication channel economy is not a problem. A synchro generator mechanically coupled to the rotatable shaft is electrically connected to a synchro motor. The rotor of the synchro motor tends to remain aligned with that of the synchro generator and is used to indicated the shaft position.

An object of this invention is to use the signal delivered by a synchro generator coupled to a rotatable device for generating digital code for transmission of the position of the rotatable device.

It is a further object of this invention to provide an improved analog-to-digital data converter.

It is a further object of this invention to provide an improved apparatus for measuring the phase difference between a pair of sinusoidal signals.

It is a further object of this invention to provide an improved apparatus for measuring the time difference between corresponding points on a pair of sinusoidal signals.

It is a further object of this invention to provide an improved apparatus for expressing in digital form the phase difference between a pair of sinusoidal signals.

In accordance with the present invention, there is provided a synchro control transformer electrically connected to a synchro generator, which is mechanically coupled to a shaft, the angular position of which is to be determined and transmitted. The rotor winding of the synchro control transformer is rotated in the magnetic field produced by its stator windings. The resulting sinusoidal envelope of the signal induced in the rotor winding is applied to a sine wave zero comparison circuit, which generates trains of first and second signal pulses respectively coincident with the 0° and the 180° points of the sinusoidal envelope. A pulse generator produces reference signal pulses at the same pulse repetition rate as that of the first signal pulses. The phase angle between the reference signal pulses and the first signal pulses is directly proportional to the displacement of the angular position of the shaft from a reference position simulated by the reference pulses.

The reference signal pulses start a digital counting circuit. The first signal pulses or the second pulses, whichever occur first after counting starts, will stop the counter. If the second pulses stop the counter, provision is made to add a number equivalent to 180° to the number stored in the counter. Therefore, the number stored is proportional to the angle being measured. In the interval between the stopping of the counter and its start at the next reference pulse, the number stored is delivered for transmission at an output terminal.

Other objects and advantages of the present invention will become apparent from the specification taken in connection with the accompanying drawings, wherein FIG. 1 is a pictorial drawing of one embodiment of this invention;

FIG. 4 is a block diagram of the embodiment of FIG. 1 and of apparatus for converting a phase difference to digital code;

FIG. 5 is a schematic diagram of a full-wave phase-sensitive detector;

FIG. 6 is a schematic diagram of a zero detector useful in the operation of this invention;

FIG. 7 is a schematic diagram of another zero detector useful in the operation of this invention;

FIG. 8 is a logical diagram of the digital converter of this invention;

Figure 1:
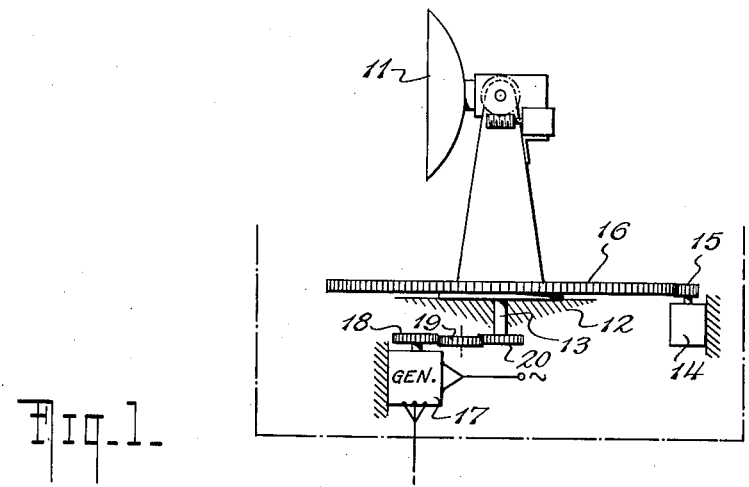

FIGURE 1 shows a device such as an antenna 11, the angular position data of which it is desired to convert to digital form for transmission to a distant location, mounted for azimuthal rotation on a platform 12 and shaft 13. A drive motor 14 rotates antenna 11 by means of a gear train comprising gears 15 and 16. A data synchro generator 17 has its rotor mechanically coupled to shaft 13 through a gear train comprising gears 18, 19, and 20. Synchro generator 17 is of a type well known in the art, being a small A.-C. machine comprising three fixed windings uniformly disposed about the circumference of a cylindrical stator shell and a rotatable winding disposed coaxially within said stator shell. A data synchro control transformer 21 is connected electrically to data synchro generator 17. Synchro control transformer 21 is also of a type well known in the art and is constructed similarly to synchro generator 17, having three stator windings and a rotor winding. The primary difference between the synchro control transformer and the synchro generator is that the former has higher impedances in the stator and rotor windings, although for some purposes they may be used interchangeably.

A reference synchro generator 22, not necessarily mounted on the antenna pedestal, has its rotor locked at a predetermined position, which corresponds to a reference azimuthal position of antenna 11. Synchro generator 22 is connected electrically to a reference synchro control transformer 23.

A motor 24 is mechanically coupled to the rotors of control transformers 21 and 23 through a gear train comprising the gears 25, 26, and 27. Motor 24 drives the rotors of control transformers 21 and 23 at the same speed and in the same direction by means of this gear train. If an alternating voltage is applied to the rotors of synchro generators 17 and 22, the rotor output voltages of synchro control transformers 21 and 23 have sine wave envelopes, the phase difference between the two envelopes being a measure of the azimuthal displacement of antenna 11 from a predetermined reference position.

Figure 2:
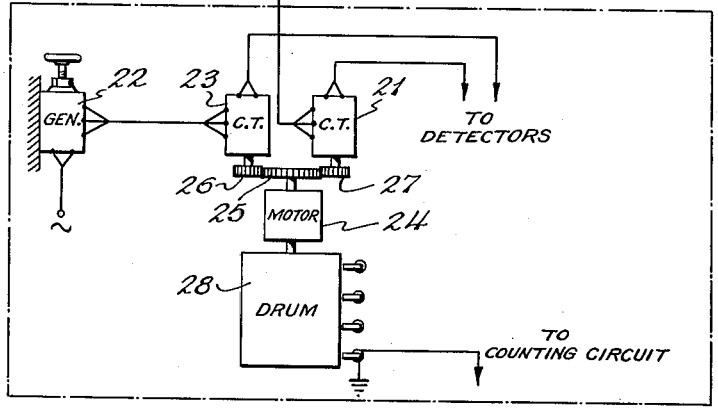
FIG. 2 is a schematic drawing of a circuit useful in explaining the theory of operation of this invention.
Figure 2:
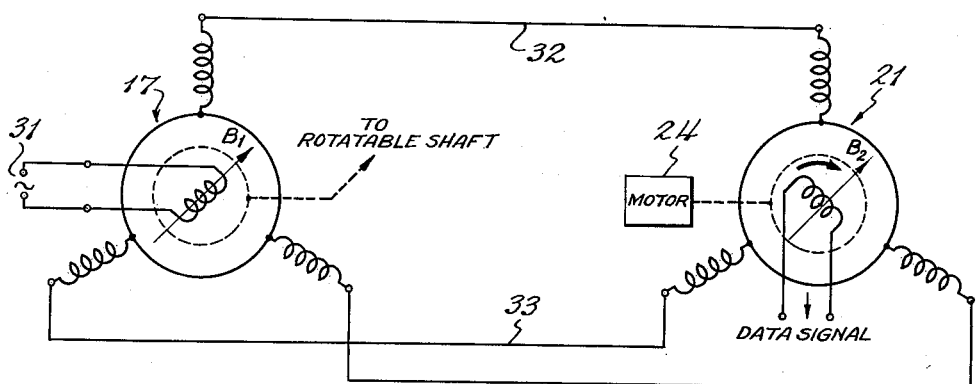

In FIGURE 2 two synchros are illustrated, the synchro on the left being a synchro generator, such as data synchro generator 17, and the synchro on the right being a synchro control transformer, such as data synchro control transformer 21.

A source of alternating voltage 31 is connected to the rotor of synchro generator 17. A waveform of this voltage is shown in FIG. 3a. The rotor winding of synchro generator 17 is mechanically coupled to the shaft whose angular position is to be converted to an electrical signal by this synchro generator-synchro control transformer combination. Current due to source 31 flowing through the rotor winding of control transformer 17 sets up an alternating magnetic field $B_1$ having a direction vector shown by the arrow, this field being parallel with the axis of the rotor winding. Alternating field $B_1$ induces voltages in each of the three stator windings of synchro generator 17, the relative magnitudes of the voltages depending on the direction vector of the alternating magnetic field. Each of the three induced voltages is either in phase or 180° out of phase with the rotor voltage. The stator windings of synchro control transformer 21 are connected in parallel with corresponding stator windings of synchro generator 17 by leads 32, 33 and 34. Consequently, the voltages induced in the stator windings of synchro generator 17 will be reproduced in magnitude and phase in the corresponding stator windings of synchro control transformer 21. As a result, an alternating magnetic field $B_2$ is set up in synchro control transformer 21, the orientaton of the magnetic field being identical with that of the field in synchro generator 17. Alternating field $B_2$ will induce a voltage in the rotor winding of control transformer 21, the magnitude and phase of the voltage induced depending on the relative angle between the rotor winding axis and the direction vector of field $B_2$. For example, when the axis of the stator winding is parallel with the direction vector of the magnetic field, maximum voltage will be induced, but when the axis is perpendicular to the direction vector, no voltage will be induced. The rotor of control transformer 21 is mechanically coupled to motor 24 and rotated at a uniform rotational speed that is considerably less than the frequency of the alternating voltage of source 31, but generally, considerably greater than any possible speed of rotation of shaft 13. Rotation of the control transformer rotor winding in a uniform alternating magnetic field modulates the induced voltage with a frequency equal to the rate of rotation. Such voltage is shown in FIG. 3b. The envelope of the wave is sinusoidal and its frequency corresponds to the rate of rotation of the rotor winding. The maximum points on the envelope correspond to angles where the rotor winding is aligned with the field direction vector. The minimum points on the envelope correspond to angles where the rotor winding is perpendicular to the field direction vector. Thus, the phase of the envelope depends on the orientation of the magnetic field direction vector. For example, if the direction vector of the magnetic field $B_2$ were to be rotated through 90° from the field causing the waveform of FIG. 3b, the phase of the envelope would shift by 90° with respect to that shown in FIG. 3b. Hence, the phase of the envelope of the voltage induced in the rotor winding of the data control transformer is equal in degrees to the position of the rotatable shaft from a reference direction.

It is now seen from FIG. 1 that the output signals from the rotor windings of control transformers 21 and 23 have envelopes whose phase angle is determined respectively by the position of the antenna 11 and the position at which the rotor of reference synchro generator 22 is locked. The difference in phase between the envelopes of these two signals will vary as the antenna rotates.

FIGURE 4 includes apparatus for converting this phase difference to digital code. The apparatus within dotted block A is that which converts to a phase difference the displacement from a reference position of a rotatable shaft, this phase difference being present in the envelopes of two output voltages, respectively designated as "data signal" and "reference signal." The apparatus within dotted block B produces electrical pulses at predetermined points on the envelopes of the data signal and the reference signal. The apparatus within dotted block C is a digital converter comprising a counting circuit, a shifting register, and associated control circuits, which serves to convert the phase dfference information to digital code.

The data signal output (FIG. 3b) of data synchro control transformer 21 is coupled to the input terminal 104 of a full-wave phase-sensitive detector 36, an example of such a detector being shown in FIG. 5. The detector includes the diodes 105, 106, 107, and 108 connected in a bridge circuit. The data signal is coupled across one diagonal of the bridge by means of a central-tapped transformer 109. The A.-C. voltage which was applied to the rotor winding of synchro generator 17 is also coupled to the reference input terminal 110 of the detector and serves as a carrier phase reference within the detector. This carrier phase reference voltage is coupled across the other bridge diagonal by means of a center-tapped transformer 111. The output signal is developed between the respective center legs 112, 113 of transformers 109, 111. The output waveform of detector 36 is shown in FIG. 3d, and is seen to be a full-wave rectified version of the A.-C. data signal, the polarity being determined by the instantaneous phase relationship between the data signal and the detector reference voltage. The modulated reference signal (FIG. 3c) delivered by reference synchro control transformer 23 is coupled to the input terminal of a full-wave phase sensitive detector 37. The same reference A.-C. voltage applied to detector 36, is also applied to detector 37. The output waveform of detector 37 is shown in FIG. 3e. The output signals of detectors 36 and 37 are coupled to respective low pass filters 38 and 39, where the high frequency components are removed from the waves. The frequency of the filter output waveforms is equal to the rate of rotation of motor 24. The output signals of filters 38 and 39 are shown respectively in FIGS. 3f and 3g.

Figure 3:
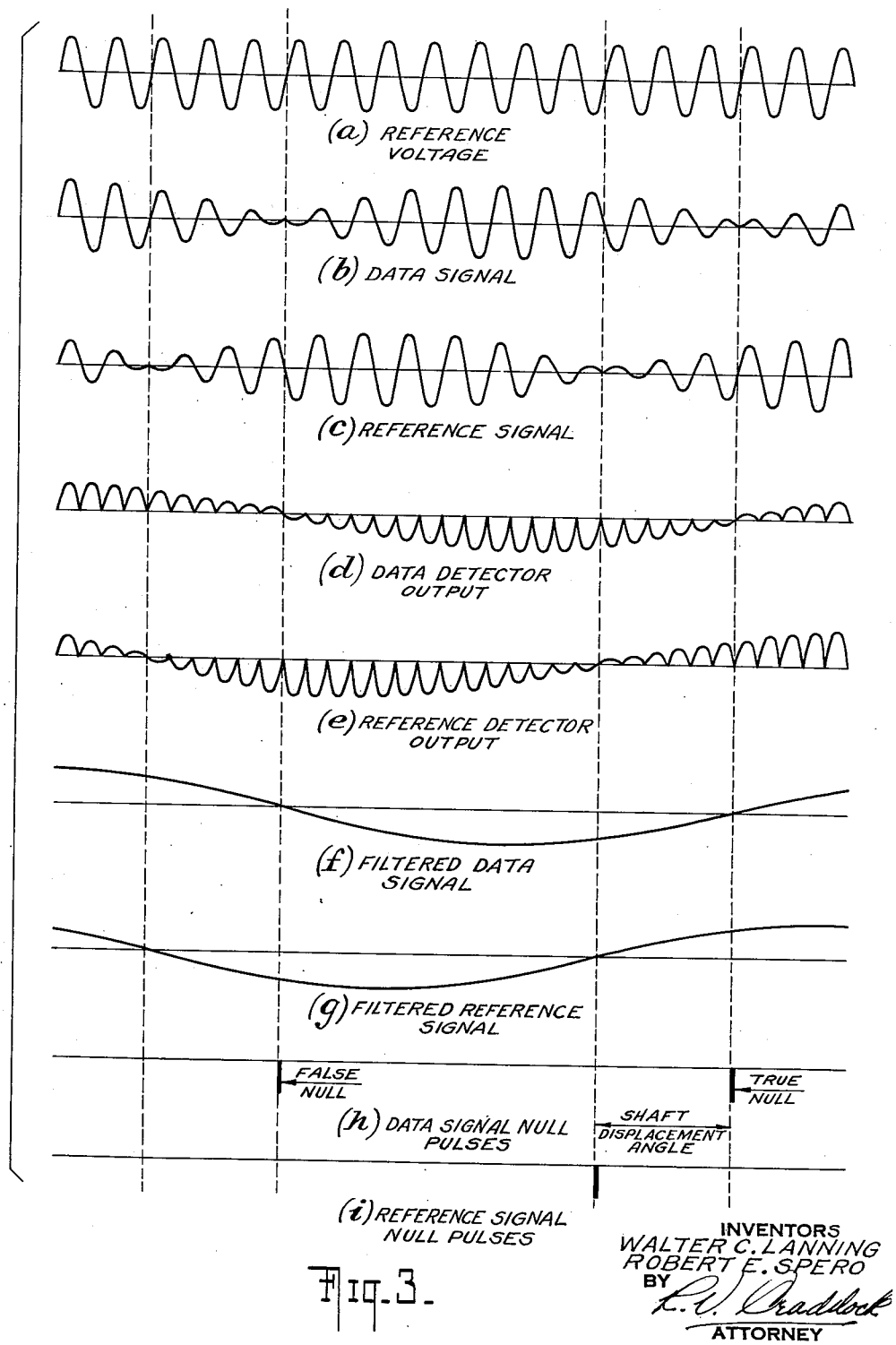
FIG. 3 is a drawing of waveforms useful in explaining the operation of this invention.

The phase difference between the filtered reference signal of FIG. 3 and the filtered data signal of FIG. 3 is equal in degrees to the angular displacement of input shaft 13 from an arbitrary reference position determined by the position of the rotor shaft of reference synchro generator 22. It is now but necessary to measure the phase difference between these two signals to determine the shaft or antenna displacement. Zero detectors 40 and 41 and the apparatus of dotted block C function to measure this phase difference and convert it to digital code for transmission. The output signal of filter 38 is connected to the input terminal of a zero detector 40 shown in detail in FIG. 6. Zero detector 40 comprises a sine wave zero comparison circuit 43 and first and second differentiating circuits comprising respectively capacitor 44 and resistor 45 and capacitor 46 and resistor 47. Sine wave zero comparison circuit 43 produces a square wave output, the transition points thereof being coincident with the 0° and 180° points of the input sine wave. The result is accomplished by "squaring" the sine wave input. During squaring the positive portion of the sine wave will be "bottomed," a process wherein there is a tendency to drive a grid of an amplifier positive accompanied by no change in plate voltage of the amplifier during the positive portion of the input wave. On the negative half cycle of the input sine wave the tube cuts off, resulting in square positive pulses from the plate of the amplifier. A sine wave zero comparison circuit is shown in "Waveforms" by Chance, et al., Radiation Laboratory Series, vol. 19, page 352.

The output square wave of circuit 43 is coupled in parallel to the two differentiators, the first having its output resistor shunted with a diode 48, which attenuates all positive signals, and the second having its output resistor shunted by a diode 49 which attenuates all negative signals. Thus, the output signals of the first differentiator are negative pulses coincident with the 0° points of the data signal sine wave, and the output signals of the second differentiator are positive pulses coincident with the 180° points of the data signal sine wave. The positive output pulses of the second differentiator are inverted in amplifier 50. Hence, the output signal of zero detector 40 is a periodically recurring series of negative electric pulses coincident with the 0° and 180° points of the input data signal sine wave, as shown in FIG. 3h. Those pulses which are coincident with the 0° point of the data signal sine wave are termed "true null" pulses and those pulses which are coincident with the 180° point of the data signal sine wave are termed "false null" pulses. The two output signals of zero detector 40 are coupled to the control circuit of the digital converter.

The output signal of filter 39 is coupled to the input terminal of zero detector 41, which is shown in detail in FIG. 7. Zero detector 41 comprises a sine wave zero comparison circuit 51 and a differentiating circuit comprising capacitor 52 and resistor 53. Sine wave zero comparison circuit 53 functions in a manner similar to comparison circuit 43, producing a square wave output which is then differentiated. A diode 54 is shunted across the output resistor of the differentiator and attenuates all positive signals. Thus, the output signals of the differentiator are negative pulses coincident with the 0° points of the reference signal sine wave. This signal is shown in FIG. 3i. The output of zero detector 41 is also coupled to the control circuit of the digital converter. The phase difference between the reference null pulses of FIG. 3i and the true null pulses of FIG. 3h is numerically equal to the angular displacement of shaft 13 from a reference position. The digital converter serves to generate in response to this phase difference, which is actually a time difference, a digital code signal for transmission.

*Digital Converter*

The digital converter of this invention is shown in logical form in FIG. 8 and in block diagram form in FIG. 4. The converter consists of a control unit 56, a counting circuit 57 and a shifting register 58. It is the function of the control unit to start and stop the counting circuit in response to proper signals; to initiate transfer of the number stored in the counting circuit to the shifting register; to cause this number to shift from the shifting register to the output terminal, where it may be transmitted to a distant location; and to clear the counting circuit for later information. When the counting circuit 57 is started a continuously recurring series of clock pulses is delivered to its input terminal. The counting circuit counts the total number of clock pulses delivered during the interval in which it is operative. If the counting circuit is started by reference pulses and stopped by true null pulses its count is directly proportional to the angular displacement of shaft 13 from the reference position. Thus, one full cycle of the reference signal of FIG. 3g corresponds to 360° angular rotation of shaft 13. In order to insure that the relationship between the clock pulse recurrence rate and the reference signal frequency remains unchanged it is necessary to synchronize the source of these clock pulses with the motor 24. This may be accomplished, for example, by generating the clock pulses by a magnetic storage drum 28, of a type well known in the art, which is mechanically coupled to and driven by motor 24. Hence for each complete rotation of the shaft of motor 24 and, thus, for a given angular rotation of the rotor windings of control transformers 21 and 23, a constant number of clock pulses is always generated.

To facilitate an explanation of the operation of these circuits the following logical definitions may be adopted:

AND—yields a 1 out if both inputs are 1. If any input is 0 the output is 0. An AND gate is depicted in FIG. 8 by a circle enclosing the letter A, and having a pair of input terminals and one output terminal.

OR—yields a 1 out if any input is 1. An OR gate is depicted in FIG. 8 by a circle enclosing the letter O, and having a pair of input terminals and one output terminal.

Counting circuit 57 comprises the bistable gates 60, 61, 62, 63, 64, 65, 66, and 67. This counting circuit is of the binary digital type. The logical symbols employed for the bistable gates are rectangular boxes having internally disposed near their upper boundaries a 0 on the left and a 1 on the right and near their lower boundaries a 0 on the left, a T in the center and a 1 on the right. The numerals near the top boundary indicate the output lines, and the numerals near the bottom indicate the input lines. The two stable states of the bistable gate can be represented by a 0 and a 1; that is, the gate is capable of storing a binary digit. A signal applied to the input line at the left side will cause the bistable gate to transfer to the state representing 0, if it is not already in that state. Similarly a signal applied to the right side input line will cause the gate to transfer to the state representing 1, if it is not already in that state. The output lines are used to indicate the states of the device that are utilized. A signal is always present on one or the other, but not both of the output lines. The state of the bistable gate is designated as 0 or 1 according to whether a signal is respectively on the left or right output line. A temporary signal applied to the common input line, T, will cause the gate to change to the opposite state from that in which it was. Such a gate is well known in the art and may be constructed, for example, from an Eccles-Jordan vacuum tube trigger circuit.

Counting circuit 57 is shown to comprise eight binary elements by way of example. Since it is desired that with all gates in the 0 state the count represents 0° angular displacement, 256 signals, or clock pulses, are necessary to once again restore the counting circuit to 0. Consequently 256 clock pulses represent 360°, or 128 clock pulses represent 180°. The counting circuit is of a conventional type in which the pulses to be counted are sent to the element of lowest order, the output of each element being connected to the common input, T, of the element of next higher order. Each time that an element changes from the 1 state to the 0 state a pulse-type signal is sent to the element of the next higher order. Differentiating circuits are employed in the leads interconnecting each bistable gate with that of the next higher order to insure that the input to the next gate is a pulse. These differentiating circuits are represented by a circle enclosing the letter D within.

In operation, reference null pulses are delivered to a count gate 68, which is a bistable gate of the type previously described. These reference null pulses are delivered to the 1 input line and cause count gate 68 to change to the 1 state. Count gate 68 delivers a 1 to AND gate 69, which in turn permits passage of clock pulses applied at terminal 70. These clock pulses are delivered through AND gate 69 to the T input line of bistable gate 60 and become counted by the circuit. Simultaneously with the delivery of a 1 to AND gate 69 a 1 is also connected through the "count gate bus" to AND gates 71, 72, 73, 74, 75, 76, and 77 thereby permitting transfer of signals from each counting circuit gate to the gate of next higher order.

Assume now that the next occurring pulses after the reference pulses are the true null pulses. These true null pulses are applied through AND gate 123 and OR gate 78 to the 0 input line of count gate 68, thereby changing the count gate to the 0 state, which in turn removes the 1 from AND gate 69. AND gate 123 permits passage of the true null pulse since a 1 is also connected to the gate from count gate 68. Removal of the 1 from AND gate 69 prevents the passage of clock pulses to the counting circuit and thereby stops the count, leaving a binary digital number stored therein. Simultaneously, the 1 is removed from the count gate bus, thereby effectively opening the circuits between each counting circuit gate and the gate of next higher order. It is now necessary that the digital converter transfer the number stored in counting circuit 57 to shifting register 58 so that the number may be transmitted to a distant location, and so that the counting circuit may be cleared for the next occurring reference pulse.

Shifting register 58 comprises the bistable gates 79, 80, 81, 82, 83, 84, 85 and 86. Shifting register 58 is a conventional binary digital type comprising a series of binary elements, each of which is capable of storing either a 0 or a 1. When a number is stored in the shifting register elements it may be delivered at the respective output lines by applying simultaneously a series of signals to the 0 input lines of each register element. Thus, each register element is changed to the 0 state, if it is not already in that state. If the element was in the 1 state, a signal is delivered to the next succeeding register element. If the element was in the 0 state, no signal is delivered to the next succeeding element. In the particular register shown the 1 output line of each element in the register is connected to the 1 input line of the next succeeding element through a delay element and an OR gate. Delay is provided to insure that the signal from a preceding element does not arrive at a succeeding element simultaneously with the signal commanding the shift. Thus, all shifting register elements are transferred simultaneously to the 0 state, and those which were in the 1 state deliver a 1 to the next succeeding element, which is then changed to the 1 state. In this manner a stored number is transferred toward the output terminal. As may be seen from FIG. 8 the number of shift command signals is equal to the number of storage elements, in this instance eight.

The true null pulses are also transmitted through delay elements 87 and 88 and the "transfer bus" to AND gates 92, 93, 94, 95, 96, 97, 98 and 99. The null pulses applied to these AND gates effectively pass through those gates which are connected to output lines of counting circuit gates that are in the 1 state. For example, if a 1 were stored in gate 60, it would effectively open AND gate 92 and permit passage of the null pulse to the 1 input line of gate 79, which will then be changed to the 1 state. Thus, the delivery of a pulse to the transfer bus transfers the number stored in the counting circuit to the shifting register.

The true null pulses are also coupled through delay elements 87, 88 and 89 to a shift gate 90, which is a bistable gate of the type described. The true null pulses are applied to the 1 input line and cause shift gate 90 to change to the 1 state. Count gate 90 delivers a 1 to AND gate 91, which permits clock pulses to pass to the "shift command bus." These clock pulses are applied simultaneously to all the 0 input lines of the shifting register elements, and the number stored therein is transferred out of the shifting register and may be transmitted to a distant location.

It is now necessary to clear the digital converter in order that positional information following the next occurring reference null pulse may be stored. The converter is cleared with a pulse delivered by a counter 100. Counter 100 has applied as an input signal the clock pulses which are delivered to the shifting circuit. Counter 100 must deliver an output signal after application of a number of clock pulses equal to the number of bistable gate elements in the shifting register. In this instance, since there are eight elements in shifting register 58, counter 100 must provide an output pulse upon receipt of eight clock pulses. The output signal of counter 100 performs two functions: it is applied to the 0 input line of shift gate 90, restoring the gate to the 0 state, which effectively closes AND gate 91; and it is directed through a counting circuit "clear bus" to the 0 input lines of all the bistable gates of the counting circuit, restoring all the elements of the counting circuit to the 0 state. Since AND gates 71, 72, 73, 74, 75, 76 and 77 were effectively open at this time no signal is transferred from one counting circuit element to the next when the element is changed to the 0 state. The digital converter has now been cleared and is ready to receive information following the next reference null pulse.

If the shaft angular displacement from the reference is close to 360° there may be insufficient time to clear the counting circuit before the arrival of the next reference null pulse. The addition of the next count to an uncleared counting circuit would cause false positional information to be delivered. Consequently, it is desired that the counting circuit be cleared a substantial time before arrival of the next reference null pulse. This is provided by permitting the false null pulses (those pulses which are generated coincident with the 180° point on the data signal sine wave) to perform the same function as the true null pulses. Thus the false null pulses which arrive at the digital converter before the true null pulses, following the reference null pulses which start the counting circuit, will be delivered through AND gate 124 and OR gate 78 and turn off count gate 68 and start shift gate 90. Thus counting will be stopped, the shifting process will be carried to completion, and the counting circuit will be cleared by the presence of false null pulses next following reference null pulses. However, since the true null, which gives the correct positional information, is displaced by 180° from the false null, it is necessary to add a count representing 180° to the number stored in the counting circuit at the time a false null pulse is utilized. This is accomplished, as shown in FIG. 8, by applying the false null pulse through delay element 101 and OR gate 102 to the input line T of bistable gate 67. This changes bistable gate 67 to the opposite state from that in which it was placed during the counting period. Under most conditions the false null pulse will arrive before a number representing 180° has been stored in the counting circuit. In such instance gate 67 will be changed to the 1 state by the false null pulse, thereby adding 180° to the number in the counting circuit.

An additional advantage is realized by utilizing both the true and false null pulses as disclosed above. If the antenna or rotatable shaft is turning rapidly it may be in a position representing, for example, 359° at the start of the counting interval and have turned to 361° shortly after counting has commenced. In this instance the first true null pulse will be missed and the circuit would continue counting beyond 360° until the arrival of the next true null pulse. However, the first false null pulse, which will occur at 181°, will stop the counting circuit and add 180° to it, giving a correct reading of 361°. Thus, there will be no missed counting intervals, and most angular information will be determined and delivered to a distant position during the first 180° of the reference signal.

Although this invention has been described with reference to a particular embodiment, other modifications and embodiments are within the spirit of this invention. For example, it is not necessary that the reference null pulses be generated in the manner described. They may be generated from an independent signal source and applied to the control unit as needed. In one method they may be generated on the magnetic storage drum 28, and thereby synchronized with the rotation of the rotor winding of control transformer 21. By adjusting the position of the reading head about the circumference of drum 28, any desired zero reference position of rotatable shaft 13 could be simulated.

This method of analog-to-digital conversion is readily applicable to multiplexing. Thus, the angular position of a plurality of rotatable shafts with respect to a predetermined reference position may be time shared. For example, the stator windings of the respective data synchro generators that are mechanically coupled to each of the shafts may be electrically connected to groups of segments circumferentially disposed about a disc. The stator windings on the data synchro transformer would then be electrically connected to a set of brushes which rotate with respect to the disc. In this manner the analog input to the data synchro control transformer would be time shared, and the digital output from the system would represent successively the angular position of a plurality of shafts.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A circuit for measuring the phase difference between first and second sinusoidal signals comprising a digital counter, means for generating a series of uniformly recurring signals to be counted by said counter, means for generating first signal pulses coincident with predetermined recurring points on the envelope of said first sinusoidal signal, means for generating second signal pulses coincident with corresponding predetermined recurring points on the envelope of said second sinusoidal signal, means for generating third signal pulses coincident with points on the envelope of said second sinusoidal signal displaced by 180° from said corresponding predetermined points, means for starting said counter in response to said first pulses, means for stopping said counter in response to the next occurring second or third pulses following said first pulses, and means for adding to the counter a number corresponding to 180° when said counter stops in response to said third pulses.

2. A circuit for measuring the phase difference between first and second sinusoidal signals comprising a digital counter, means for generating a series of uniformly recurring signals to be counted by said counter, means for generating first signal pulses coincident with the 0° points of said first sinusoidal signal, means for generating second signal pulses coincident with the 0° points of said second sinusoidal signal, means for generating third signal pulses coincident with the 180° points of said second sinusoidal signal, means for starting said counter in response to said first pulses, means for stopping said counter in response to the next occurring second or third pulses following said first pulses, and means for adding to the counter a number corresponding to 180° when said counter stops in response to said third pulses.

3. A circuit for measuring the phase difference between first and second sinusoidal signals comprising a digital counter, means for generating first signal pulses coincident with predetermined recurring points on the envelope of said first sinusoidal signal, means for generating second signal pulses coincident with corresponding predetermined recurring points on the envelope of said second sinusoidal signal, means for generating third signal pulses coincident with points on the envelope of said second sinusoidal signal displaced by 180° from said corresponding predetermined points, means for starting said counter in response to said first pulses, means for stopping said counter in response to the next occurring second or third pulses following said first pulses, and means for adding to the counter a number corresponding to 180° when said counter stops in response to said third pulses.

4. A circuit for measuring the phase difference between first and second signals having a common fundamental frequency component comprising a digital counter, means for generating first signal pulses coincident with predetermined recurring points on the envelope of said first signal, means for generating second signal pulses coincident with corresponding predetermined recurring points on the envelope of said second signal, means for generating third signal pulses coincident with points on the envelope of said second signal displaced by 180° with respect to said fundamental frequency component from said corresponding predetermined points, means for starting said counter in response to said first pulses, means for stopping said counter in response to the next occurring second or third pulses following said first pulses, and means for adding to the counter a number corresponding to 180° when said counter stops in response to said third pulses.

5. A circuit for measuring the phase difference between first and second signals comprising a digital counter, means for generating first signal pulses having a recurrence frequency equal to the frequency of said first signal and being displaced from said first signal by a first predetermined phase difference, means for generating second signal pulses having a recurrence frequency equal to the frequency of said second signal and being displaced from said second signal by said first predetermined phase difference, means for generating third signal pulses having a recurrence frequency equal to that of said second signal pulses and being displaced from said second signal pulses by a second predetermined phase difference, means for starting said counter in response to said first pulses, means for stopping said counter in response to the next occurring second or third pulses following said first pulses, and mean for adding to the counter a number corresponding to said second predetermined phase difference when said counter stops in response to said third pulses.

6. A circuit for measuring the phase difference between first and second sinusoidal signals comprising a digital counter, means for generating first signal pulses coincident with predetermined recurring points on the envelope of said first sinusoidal signal, means for generating second signal pulses coincident with corresponding predetermined recurring points on the envelope of said second sinusoidal signal, means for generating third signal pulses coincident with points on the envelope of said second sinusoidal signal displaced from said corresponding predetermined points by a predetermined phase angle, means for starting said counter in response to said first pulses, means for stopping said counter in response to the next occurring second or third pulses following said first pulses, and means for adding to the counter a number corresponding to said predetermined phase angle when said counter stops in response to said third pulses.

References Cited in the file of this patent

UNITED STATES PATENTS

| | | |
|---|---|---|
| 2,370,692 | Shepherd | Mar. 6, 1945 |
| 2,416,333 | Lehman | Feb. 25, 1947 |
| 2,513,528 | Sohon | July 4, 1950 |
| 2,703,879 | Courtney | Mar. 8, 1955 |
| 2,706,274 | Boyer | Apr. 12, 1955 |
| 2,736,007 | Kenyon | Feb. 21, 1956 |
| 2,758,277 | Daspit | Aug. 7, 1956 |
| 2,776,421 | Nessmith | Jan. 1, 1957 |
| 2,794,928 | Frank | June 4, 1957 |
| 2,874,352 | Durbin | Feb. 17, 1959 |
| 2,877,416 | Grisdale | Mar. 10, 1959 |
| 2,918,625 | Houghton et al. | Dec. 22, 1959 |

FOREIGN PATENTS

| | | |
|---|---|---|
| 806,659 | Great Britain | Dec. 31, 1958 |

OTHER REFERENCES

"Automatic Peak Time Detector," J. V. Disney, Jr.— IBM Technical Disclosure Bulletin, vol. 1, No. 1, June, 1958; page 26.